United States Patent
Asai

(10) Patent No.: US 9,225,212 B2
(45) Date of Patent: Dec. 29, 2015

(54) METHOD OF MANUFACTURING BONDED-MAGNET ROTOR

(75) Inventor: Hiroki Asai, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 360 days.

(21) Appl. No.: 14/001,631

(22) PCT Filed: Mar. 23, 2012

(86) PCT No.: PCT/JP2012/002015
§ 371 (c)(1),
(2), (4) Date: Aug. 26, 2013

(87) PCT Pub. No.: WO2012/132357
PCT Pub. Date: Oct. 4, 2012

(65) Prior Publication Data
US 2013/0328433 A1    Dec. 12, 2013

(30) Foreign Application Priority Data
Mar. 30, 2011 (JP) .................................. 2011-075019

(51) Int. Cl.
H02K 15/02 (2006.01)
H02K 15/10 (2006.01)
(Continued)

(52) U.S. Cl.
CPC .................. *H02K 1/28* (2013.01); *H01F 7/021* (2013.01); *H01F 41/0266* (2013.01); *H02K 15/0012* (2013.01); *H02K 15/03* (2013.01); *Y10T 29/49012* (2015.01)

(58) Field of Classification Search
CPC ... H02K 1/2786; H02K 15/0012; H02K 1/02; H01F 41/0266; H01F 1/0578; Y10T 29/49009; Y10T 29/49012; Y10T 428/12465
USPC .............. 29/598, 596, 597, 604, 607; 310/44, 310/75 D, 156.21, 156.43
See application file for complete search history.

(56) References Cited

U.S. PATENT DOCUMENTS 7,586,660 B2   9/2009 Itami
7,847,460 B2 * 12/2010 Masuzawa ................ H01F 1/26
                                                      148/101
(Continued)

FOREIGN PATENT DOCUMENTS

CN    1086932 A    5/1994
CN    1934662 A    3/2007
(Continued)

OTHER PUBLICATIONS

English language translation of Search Report in corresponding Chinese Application No. 201280016255.6, dated Mar. 31, 2015, 3 pages.
(Continued)

*Primary Examiner* — Thiem Phan
(74) *Attorney, Agent, or Firm* — Brinks Gilson & Lione

(57) ABSTRACT

A method of manufacturing a bonded-magnet rotor according to the invention includes forming step and arranging step. The forming step is by forming a bonded-magnet formed body. The arranging step includes: integrating an inside-diameter holding jig, a rotor core, and a rotor-core presser jig; arranging the bonded-magnet formed bodies on the outside periphery of the inside-diameter holding jig; and arranging an outside-diameter-holding magnet-pressure-welding jig to support outside peripheral faces of the bonded-magnet formed bodies. The method further includes steps of: deforming the bonded-magnet formed bodies to fit with the outside peripheral dimension of the rotor core by pressing and transferring the bonded-magnet formed bodies to the rotor core with a forming jig; mutually joining end portions of adjacent ones of the bonded-magnet formed bodies; and integrating the bonded-magnet formed bodies with the rotor core by compressing the bonded-magnet formed bodies. This configuration allows the bonded-magnet rotor with high dimension accuracy.

3 Claims, 5 Drawing Sheets

(51) Int. Cl.
*H02K 1/28* (2006.01)
*H02K 15/03* (2006.01)
*H01F 7/02* (2006.01)
*H01F 41/02* (2006.01)
*H02K 15/00* (2006.01)

(56) References Cited

U.S. PATENT DOCUMENTS

| | | | |
|---|---|---|---|
| 7,906,881 B2 * | 3/2011 | Enomoto | H02K 1/278 310/156.43 |
| 2006/0208179 A1 | 9/2006 | Itami | |
| 2007/0170801 A1 | 7/2007 | Sato et al. | |
| 2009/0085416 A1 | 4/2009 | Masuzawa et al. | |

FOREIGN PATENT DOCUMENTS

| | | |
|---|---|---|
| CN | 101162638 A | 4/2008 |
| CN | 101401278 A | 4/2009 |
| JP | 02-260402 A | 10/1990 |
| JP | 11-186027 A | 7/1999 |
| JP | 2001-52921 A | 2/2001 |
| JP | 2006-259446 A | 9/2006 |
| JP | 2007-236113 A | 9/2007 |
| JP | 2008-160973 A | 7/2008 |
| JP | 2011-015571 A | 1/2011 |
| WO | WO 93/22778 A1 | 11/1993 |

OTHER PUBLICATIONS

International Search Report for International Application No. PCT/JP2012/002015, dated Jun. 19, 2012, 2 pages.

* cited by examiner

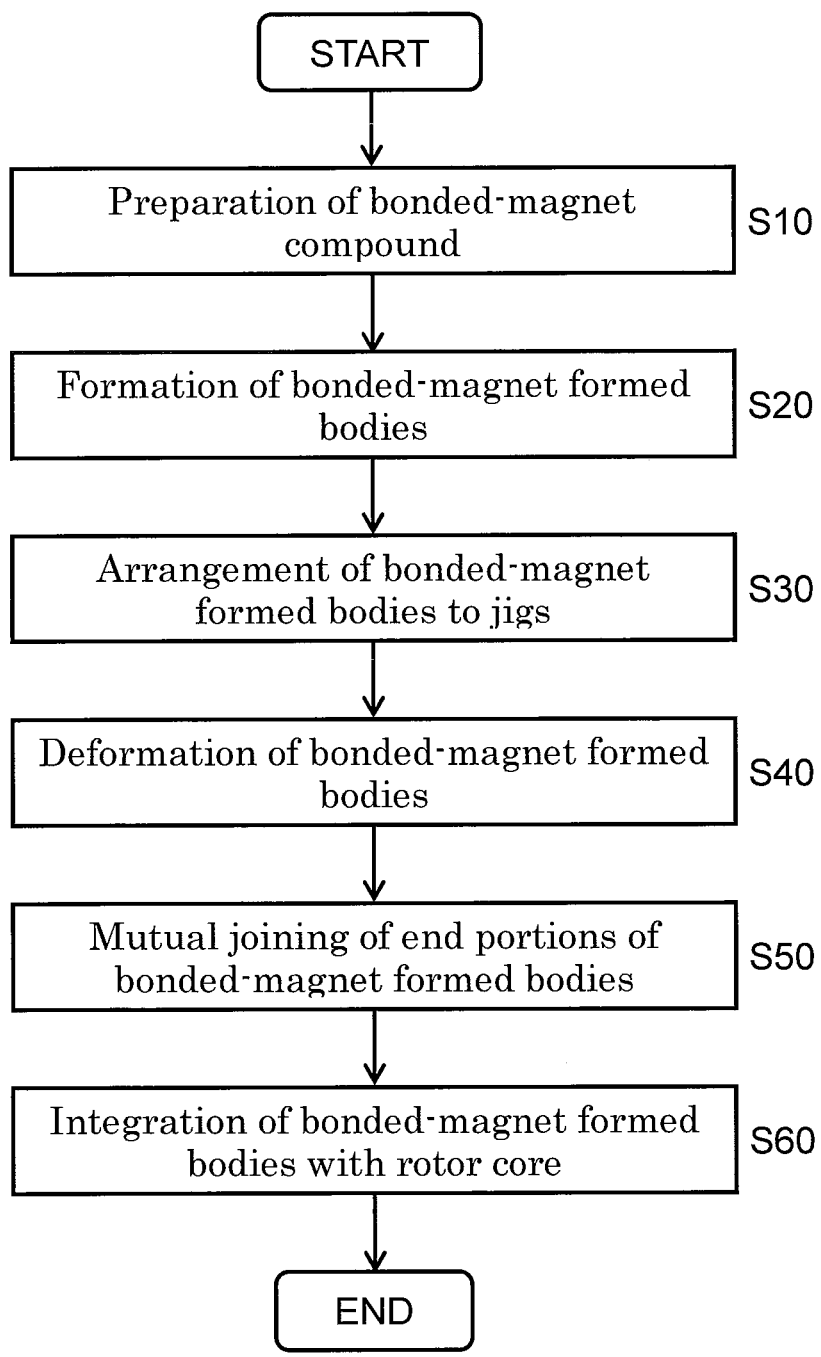

METHOD OF MANUFACTURING BONDED-MAGNET ROTOR

This application is a 371 application of PCT/JP2012/002015 having an international filing date of Mar. 23, 2012, which claims priority to JP2011-075019 filed Mar. 30, 2011, the entire contents of which are incorporated herein by reference.

TECHNICAL FIELD

The present invention relates to a bonded-magnet rotor, a method of manufacturing thereof, and a motor provided therewith.

BACKGROUND ART

Permanent magnets configuring a component of a motor are used in a variety of configurations as shown below, in accordance with applications and specifications. The configurations include, for example, a rotor formed with permanent magnets that are secured on the surface of a rotor core thereof, and a rotor formed with permanent magnets of a predetermined shape that are arranged and secured to the inside of a rotor core thereof. With the configurations, the permanent magnets to be secured are selected from a variety of materials, such as sintered magnets and bonded magnets, having different magnetic properties depending on required motor performances. Moreover, the permanent magnets employ various types of shapes, such as circular-arc imbricate magnets, plate-like magnets, and ring magnets.

Moreover, permanent magnets are used in a wide range of applications including a type of motor in which permanent magnets are secured to a bracket side thereof and a rotor is rotated utilizing a magnetic field generated by the permanent magnets.

Conventionally, the permanent magnets of this kind are secured to the rotor core or the bracket, chiefly by bonding process using adhesive.

Hereinafter, the aforementioned bonding process is briefly described with reference to FIGS. 5A and 5B.

FIG. 5A is a plan view illustrating the bonding process of a conventional rotor. FIG. 5B is a cross-sectional view illustrating the bonding process of the conventional rotor.

First, as shown in FIGS. 5A and 5B, adhesive 22 is charged between adherend materials, such as magnet pieces 23 and rotor core 21. Then, charged adhesive 22 is cured to bond and secure rotor core 21 and magnet pieces 23 by the bonding process including, for example, thermal curing, anaerobic curing by purging air, and ultraviolet-light irradiation curing, used alone or in combination with them depending on curing characteristics of adhesive 22.

On the other hand, when using permanent magnets in an environment where adhesive cannot be used, a process without using adhesive is chosen, such as securing with a blade spring.

Moreover, it is possible to employ a process of press fitting described below, for a motor of an outer-rotor type in the case where a permanent magnet is secured to the inner peripheral side of a member such as a rotor core. In this case, first, when using a bonded magnet as the permanent magnet, the bonded magnet is pressed into a rotor frame, with the outside diameter of the bonded magnet being larger, by a predetermined dimension, than the inside diameter of the rotor frame to which the magnet is secured. Then, the bonded magnet is secured to the inside of the rotor frame utilizing elastic force of the bonded magnet, thereby configuring the rotor.

Furthermore, for a method of manufacturing another rotor, a process is disclosed in Patent Literature 1, for example. That is, the process described in Patent Literature 1 is such that a permanent magnet formed in a ring shape is secured to another ring member by pressing the outer periphery of the permanent magnet into the ring member. In this process, high bonding strength appears to be not necessary because, when the rotor rotates, the permanent magnet is pressed against the ring member by centrifugal force toward its outside, and because the permanent magnet is of a ring shape. For this reason, the method of bonding the permanent magnet is not particularly described in Patent Literature 1.

On the other hand, in the case where the bonded magnet is secured onto the surface of a rotor core, the method of bonding is such that the bonded magnet is secured onto the rotor core by press fitting process, utilizing a difference in dimension between the bonded magnet and the rotor core described above. This requires that the outside diameter of the rotor core be designed to be larger than the inside diameter of the ring-shaped bonded magnet. In this case, the press fitting is carried out in such a way that the ring-shaped bonded magnet is expanded in the radial direction, which results in an expansion of the bonded magnet in excess of its limit during press fitting. As a result, there has been a practical problem, e.g. a fracture of the bonded magnet in manufacturing, and a decrease in fracture strength of the bonded magnet.

Moreover, in the method of manufacturing the conventional rotor, when magnet pieces are secured to the rotor core and the edge portions of the circular-arc magnet pieces are joined to each other to form a ring-shaped bonded magnet, the shape of the respective magnet pieces changes as they cure. For this reason, there has been another problem that dimension accuracy of the rotor is less stable.

Furthermore, in forming the conventional rotor, there has been still another problem that, when forming the rotor, it is difficult to carry out precise phase-alignment between magnetizing positions of main magnet pieces and a magnetizing position of a magnet piece for positioning.

In addition, in the bonding process, there exist problems particular to adhesive, for example, variations in accuracy of bonding positions of the respective magnet pieces, eccentricities due to a bonding misalignment, and variations in outside diameters caused by variations in bonding thickness. As a result, there has been a problem that it is difficult to form the rotor with high accuracy. Additionally, high bonding strength has been necessary to prevent the respective magnet pieces from being scattered by centrifugal force when the rotor rotates.

Patent Literature 1: Japanese Patent Unexamined Publication No. H02-260402

SUMMARY OF THE INVENTION

A method of manufacturing a bonded-magnet rotor according to the present invention includes a step of forming and a step of arranging. The step of forming is by forming a bonded-magnet formed body. The step of arranging including: integrating an inside-diameter holding jig that supports the inside peripheral faces of the bonded-magnet formed bodies, a rotor core, and a rotor-core presser jig that supports a lower portion of the rotor core; arranging a plurality of the bonded-magnet formed bodies on the outside periphery of the inside-diameter holding jig; and arranging an outside-diameter-holding magnet-pressure-welding jig that supports the outside peripheral faces of the bonded-magnet formed bodies. Moreover, the method further includes steps of: deforming the plurality of bonded-magnet formed bodies to fit with the outside peripheral dimension of the rotor core in such a way that the bonded-magnet formed bodies are pressed and transferred to the rotor core with forming jigs arranged in the up-and-down direction; mutually joining the end portions of adjacent ones of the plurality of the bonded-magnet formed bodies; and integrating the plurality of the adjacent bonded-magnet formed bodies with the rotor core by compressing the bonded-magnet formed bodies in the direction from the outside periphery to the inside periphery.

With this configuration, each of the bonded-magnet formed bodies is pressure-welded and bonded with the rotor core, with the bonded-magnet formed body being formed into a ring shape. As a result, the bonded-magnet rotor is formed such that a bonding layer between the rotor core and the respective bonded-magnet formed bodies is almost zero in thickness. Moreover, the bonded-magnet formed bodies prior to the deformation can be positioned with reference to a reference position of the rotor core. Therefore, it is possible to clarify the deformation of the bonded-magnet formed bodies after their positioning and to clarify pole positions configuring the respective bonded-magnet formed bodies after the integration, with reference to a reference position of the bonded-magnet rotor. As a result, it is possible to reduce a phase misalignment of the pole positions relative to a pole position of another bonded-magnet formed body for a sensor, with the bonded-magnet formed body being attached with reference to the reference position. Accordingly, a phase can be accurately positioned between magnetizing positions of the bonded-magnet formed bodies and a magnetizing position of the bonded-magnet formed body for the sensor for positioning.

Moreover, the bonded-magnet rotor according to the present invention is formed by the aforementioned method of manufacturing the bonded-magnet rotor, which allows the bonded-magnet rotor with highly accurate dimensions.

Furthermore, the motor according to the present invention includes at least a stator and the bonded-magnet rotor described above, which allows a minimized gap between the stator and the rotor, leading to the motor with a high working point, capable of being driven with high efficiency.

BRIEF DESCRIPTION OF THE DRAWINGS

FIG. 2 is a flow chart illustrating a method of manufacturing the bonded-magnet rotor according to the first exemplary embodiment of the present invention.

DETAILED DESCRIPTION OF THE PREFERRED EMBODIMENTS

Hereinafter, a description will be made of a bonded-magnet rotor, a method of manufacturing the rotor, and a motor including the rotor according to exemplary embodiments of the present invention, with reference to the drawings. Note that it is understood that the present invention is not limited to these exemplary embodiments.

First Exemplary Embodiment

Hereinafter, a bonded-magnet rotor manufactured by a manufacturing method according to a first exemplary embodiment of the present invention will be described, with reference to FIG. 1.

Figure 1:
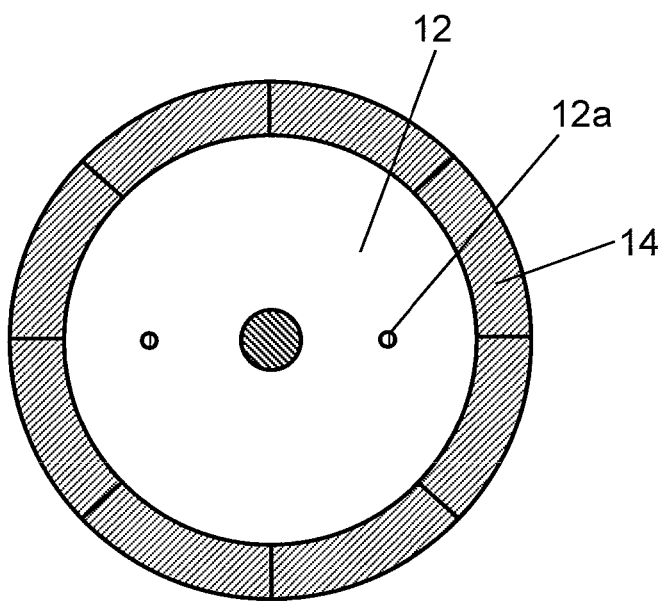
FIG. 1 is a plan view illustrating an example of a bonded-magnet rotor configured with bonded-magnet formed bodies according to a first exemplary embodiment of the present invention.

FIG. 1 is a plan view illustrating an example of the bonded-magnet rotor configured with bonded-magnet formed bodies according to the first exemplary embodiment of the present invention.

As shown in FIG. 1, bonded-magnet rotor 10 according to the first exemplary embodiment is configured with, for example, bonded-magnet formed bodies 14 with eight poles. The bonded-magnet formed bodies are secured to the outside periphery of the rotor core 12 that is configured with a structure, e.g. laminated silicon steel plates. In this case, each of bonded-magnet formed bodies 14 is chiefly composed of materials, for example, an SmFeN-based magnetic powder and an NdFeB-based magnetic powder that is anisotropic so as to provide an axis of easy magnetization in a uniaxial direction. Each of the bonded-magnet formed bodies is formed in a circular-arc shape, for example, which corresponds to one pole of the eight-pole bonded-magnet rotor.

Moreover, the surface of rotor core 12 on which bonded-magnet formed bodies 14 are bonded is such that: The silicon steel plates are laminated to have a surface in their cross-sectional direction, and the resulting surface configures the outside peripheral face of rotor core 12. Therefore, the surface of the rotor core has bumps and dips corresponding to the thicknesses of the respective silicon steel plates. For this reason, when securing bonded-magnet formed bodies 14 to rotor core 12 by pressure welding involved in the manufacturing method to be described hereinafter, such bumps and dips of the outside peripheral face of rotor core 12 are preferably useful. Moreover, in thermal curing of bonded-magnet formed bodies 14 to be described below, the bumps and dips located in a bonding face between bonded-magnet formed bodies 14 and rotor core 12 can enhance anchoring effect of binder components such as resins in partially-melted bonded-magnet formed bodies 14. As a result, the bonding strength between bonded-magnet formed bodies 14 and rotor core 12 increases, resulting in high securing strength.

Then, bonded-magnet rotor 10 described above is combined with a stator to manufacture a motor, which allows the motor to be capable of being driven with high efficiency.

Hereinafter, an example of the method of manufacturing the bonded-magnet rotor according to the first exemplary embodiment of the present invention will be described, with reference to FIGS. 2 to 4.

FIG. 2 is a flow chart illustrating the method of manufacturing the bonded-magnet rotor according to the first exemplary embodiment of the present invention. FIGS. 3A to 3D are each a schematic perspective view illustrating the method of manufacturing the bonded-magnet rotor according to the first exemplary embodiment of the present invention. FIG. 4 is a schematic cross-sectional view illustrating the method of manufacturing the bonded-magnet rotor shown in FIGS. 3A to 3D.

First, as shown in FIG. 2, a bonded-magnet compound is prepared by the following process (step S10).

To begin with, an anisotropic NdFeB magnetic powder is sufficiently mixed, with a kneading machine, with an acetone solution of a novolac-type epoxy resin, i.e. a thermosetting resin with a softening temperature of 80° C., for example. After that, the acetone is vaporized to form a coating of the epoxy resin on the surface of the NdFeB magnetic powder.

Similarly, with a kneading machine, an SmFeN fine powder is mixed with an acetone solution of a novolac-type epoxy resin with a softening temperature of 80° C., for example. After that, the acetone is vaporized to form a coating of the epoxy resin on the surface of the SmFeN fine powder.

Then, the NdFeB magnetic powder coated with the epoxy resin, the SmFeN fine powder coated with the epoxy resin, a polyamide resin, and a lubricant are mixed to prepare a mixture with such as a mixer. Use of the polyamide resin and the lubricant is intended to provide flexibility and adhesive property. In this case, the mixing ratio of the NdFeB magnetic powder to the SmFeN fine powder is 3:2, for example. Moreover, the weight ratio (wt %) of the epoxy resin is 1.1 wt %, and the weight ratio of the polyamide resin and the lubricant is 2.3 wt %.

Needless to say, it is understood that the mixing ratio and the weight ratios described above are not limited these values and various modifications of them may be contemplated in accordance with required characteristics.

Then, the mixture described above is continuously charged into a gap between heated rolls, i.e. a kneading machine, and kneaded into a kneaded product. By this process, the polyamide resin is softened and kneaded into the mixture. In this case, since the rolls need not be heated up to the temperature at which the polyamide resin melts, the rolls are heated during the kneading to a temperature of 140° C., for example. Note that, as a kneading machine, an extruder or the like may be used other than the rolls described above.

Then, the kneaded product in which the magnetic powder materials described above and the polyamide resin are kneaded is cooled down to room temperature, and then crushed or cracked into a granular powder with a grain size of not larger than 350 μm, for example. Then, the resulting granular powder is added and mixed with a fine powder of an imidazole-based curing agent with a curing onset temperature of 170° C., for example, to prepare the bonded-magnet compound.

Next, as shown in FIG. 2, each of bonded-magnet formed bodies 14 is formed using the bonded-magnet compound described above (step S20). Note that, hereinafter, a description will be made using an example in which the outside diameter of the rotor core configured with silicon steel plates is 47 mm, and the thickness of the bonded-magnet formed bodies to be pressure-welded and secured is 1.5 mm. Moreover, the description will be made for the case where the inside diameter of outside-diameter-holding magnet-pressure-welding jig 15 is approximately 50 mm, which is composed of aluminum, for example, and arranged at the outside of the bonded-magnet rotor to be formed.

First, the cavity of a metal mold with a rectangular shape is filled with the bonded-magnet compound.

Then, the metal mold filled with the bonded-magnet compound is placed between magnetic poles of a magnetic field generator, with the magnetic poles generating a magnetic field to orientate the magnetic powder in the bonded-magnet compound in any direction. After that, in order to orientate the magnetic powder in the bonded-magnet compound in a predetermined direction, the magnetic field is formed between the magnetic poles of the magnetic field generator. Then, in the orientation magnetic field, the bonded-magnet compound is subjected to compression molding with a both side punch to form a compressed body with a rectangular shape. In this case, the compression molding is carried out under the conditions such that, for example, the metal mold temperature is 160° C., the molding pressure is 150 MPa, the orientation magnetic field is 1.3 MA/m, and the molding time is 30 seconds. Moreover, the magnetic-field orientation forming is carried out by orthogonal magnetic-field forming, for example.

Next, the rectangular metal mold accommodating the orientation-controlled rectangular compressed body is combined with a circular-arc metal mold. Then, the compressed body accommodated in the rectangular metal mold is transferred into the circular-arc metal mold, so that the compressed body is deformed into a circular-arc shape. In this case, the metal mold is designed such that the curvature of the inside diameter side of the circular-arc shape of the bonded-magnet formed body is finally smaller than the curvature of the outside diameter side of the rotor core. With this configuration, each of bonded-magnet formed bodies 14 is formed with an imbricate and circular-arc shape in an uncured state, with the magnetic powder of the bonded-magnet compound being unidirectionally oriented. This results from that the formation is made in an uncured state; that is, bonded-magnet formed body 14 is formed at the mold temperature of 160° C., while the curing onset temperature of the curing agent in the bonded-magnet compound is 170° C.

Then, while remaining the above state after forming bonded-magnet formed body 14, the metal mold is subjected to a demagnetization process in such a way that, for example, an alternating magnetic field is once applied and then the intensity of the applied magnetic field is gradually attenuated. This process is intended to prevent the magnetic powder from sticking to the metal mold in the subsequent steps. Note that it goes without saying that the demagnetization process may be carried out after carrying out the magnetic field orientation with the rectangular metal mold.

Hereinafter, a step will be described of arranging, to jigs, thus-molded bonded-magnet formed bodies 14 in the uncured state, with reference to FIGS. 2 to 3B.

Figure 3A:
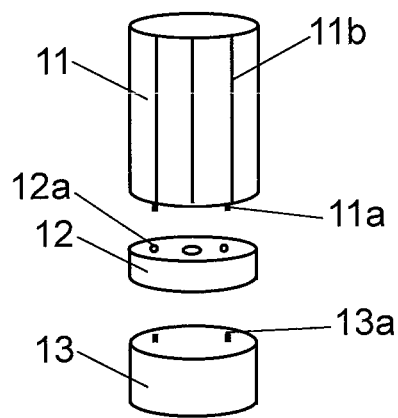
FIG. 3A is a schematic perspective view illustrating the method of manufacturing the bonded-magnet rotor according to the first exemplary embodiment of the present invention.

First, as shown in FIG. 3A, there are integrated (hereinafter, referred to as an "integrated jig") inside-diameter holding jig 11 that supports the inside peripheral face of the bonded-magnet formed bodies, rotor core 12, and rotor-core presser jig 13 that supports the lower portion of the rotor core, with the jigs and the rotor core being formed with the same outside diameter. With this configuration, rotor core 12 is arranged between rotor-core presser jig 13 and inside-diameter holding jig 11. Then, because of the same outside diameter of inside-diameter holding jig 11, rotor core 12, and rotor-core presser jig 13, they can be integrated so continuously without any step height that bonded-magnet formed bodies 14 are transferred smoothly. Note that materials of inside-diameter holding jig 11, rotor core 12, and rotor-core presser jig 13 may be ones for use in metal molds such as S45C, for example. Taking demagnetizing treatment into consideration, in particular, the materials are preferably such as nonmagnetic metals and nonmagnetic carbides. Moreover, in consideration of a difference in linear expansion coefficients of jigs' materials and consideration of temperatures of 100° C. to 200° C. at which the subsequent pressure welding and bonding is carried out, it is preferable that the materials be selected and that the jigs be made to have respective predetermined outside diameters at room temperature such that their outside diameters become identical to each other at the temperature of the pressure welding and bonding process. With this configuration, on its face facing rotor core 12, inside-diameter holding jig 11 has positioning projections 11a that configure at least two positioning parts. On its face facing rotor core 12, rotor-core presser jig 13 has positioning projections 13a that configure at least two positioning parts. Moreover, positioning holes 12a configuring the positioning parts are disposed in rotor core 12 at locations facing positioning projections 11a of inside-diameter holding jig 11 and facing positioning projections 13a of rotor-core presser jig 13.

Moreover, in the outside peripheral face of inside-diameter holding jig 11, grooves 11b are disposed at locations corresponding to the number of the poles (e.g. eight poles) of the bonded-magnet rotor and to the both end portions of circular-arc bonded-magnet formed bodies 14. Note that the depth of grooves 11b of inside-diameter holding jig 11 is formed to become shallower toward rotor core 12 in a phased manner. With this configuration, the end portions of bonded-magnet formed bodies 14 are extended in the direction toward the outside periphery as bonded-magnet formed bodies 14 is transferred to rotor core 12, as described later.

Figure 3B:
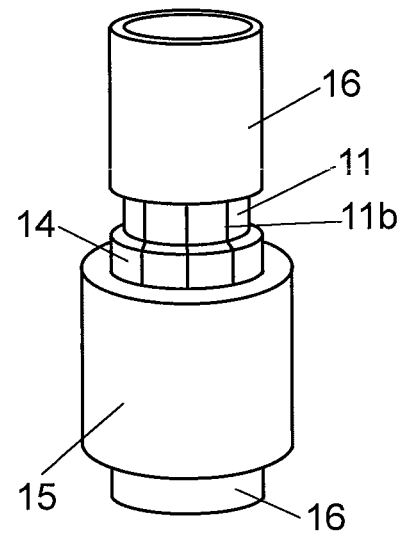
FIG. 3B is a schematic perspective view illustrating the method of manufacturing the bonded-magnet rotor according to the first exemplary embodiment of the present invention.
Figure 4:
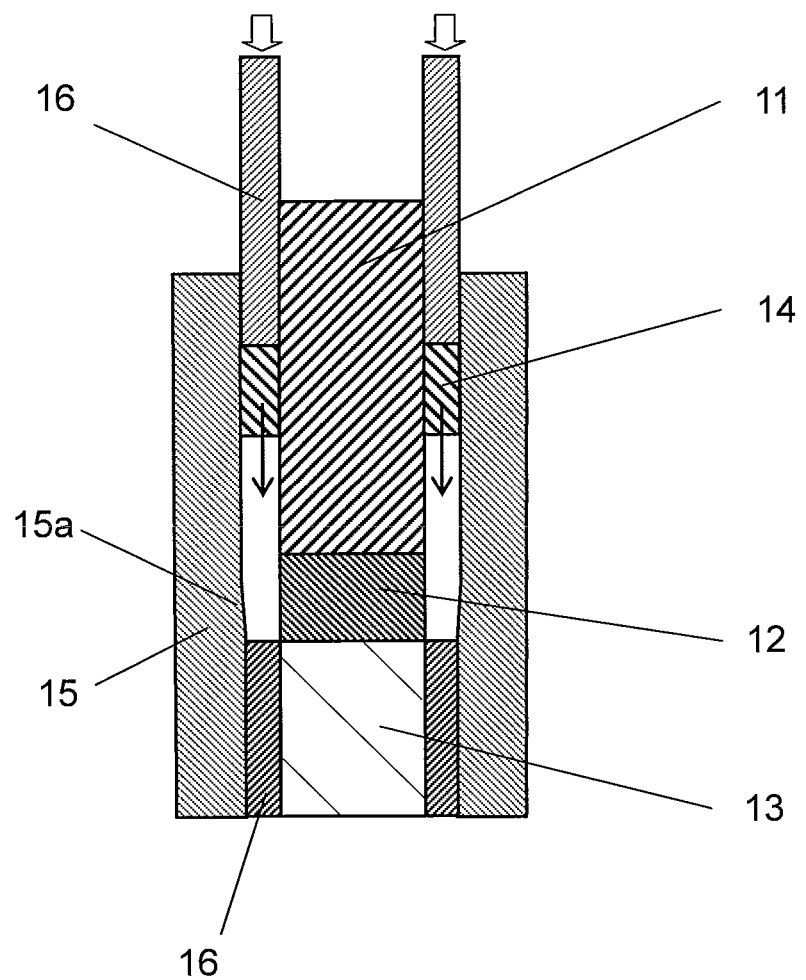
FIG. 4 is a schematic cross-sectional view illustrating the method of manufacturing the bonded-magnet rotor shown in FIGS. 3A to 3D.
Figure 5A:
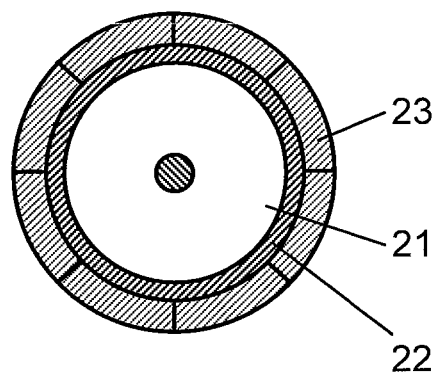
FIG. 5A is a plan view illustrating a bonding process of a conventional rotor.
Figure 5B:
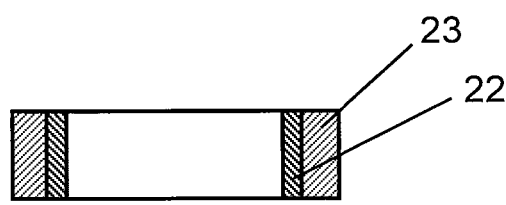
FIG. 5B is a cross-sectional view illustrating the bonding process of the conventional rotor.

Next, as shown in FIGS. 3B and 4, the integrated jig is arranged on lower forming jig 16 that configures a pair of upper and lower forming jigs 16. Then, both end portions of the circular-arc shapes of bonded-magnet formed bodies 14 are arranged on the outside peripheral face of inside-diameter holding jig 11, at locations corresponding to grooves 11b, with the bonded-magnet formed bodies being in the uncured state and corresponding to the eight poles, for example. With this configuration, bonded-magnet formed bodies 14 are arranged, with the inside curvature of the bonded-magnet formed bodies being smaller than the outside curvature of rotor core 12.

Then, as shown in FIGS. 2, 3B, and 4, outside-diameter-holding magnet-pressure-welding jig 15 is arranged on the outside periphery of bonded-magnet formed bodies 14 that are arranged on the outside periphery of inside-diameter holding jig 11. Outside-diameter-holding magnet-pressure-welding jig 15 defines the outside diameter of bonded-magnet formed bodies 14, as well as prevents bonded-magnet formed bodies 14 with a circular-arc shape from extending toward the outside periphery. Note that the integrated jig and outside-diameter-holding magnet-pressure-welding jig 15 are held in a constant-temperature oven at a temperature of 160° C., for example, with the integrated jig being configured with inside-diameter holding jig 11, rotor core 12, and rotor-core presser jig 13 that supports the lower portion of rotor core 12, as described above. Moreover, circular-arc bonded-magnet formed bodies 14 are held in a high temperature environment of 160° C. for 120 seconds, for example, and are then attached on the outside peripheral face of inside-diameter holding jig 11 of the integrated jig held at a temperature of 160° C.

Next, as shown in FIGS. 3B and 4, upper forming jig 16 is inserted onto and arranged on inside-diameter holding jig 11 from the upper side of bonded-magnet formed bodies 14 (step S30).

Figure 3C:
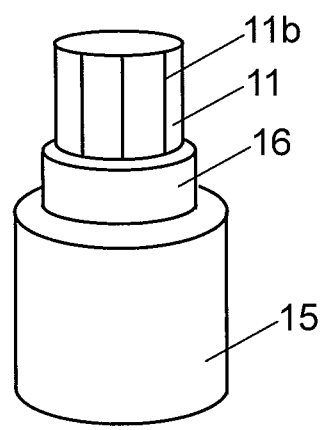
FIG. 3C is a schematic perspective view illustrating the method of manufacturing the bonded-magnet rotor according to the first exemplary embodiment of the present invention.

Then, as shown in FIGS. 2, 3C, and 4, upper forming jig 16 is inserted along inside-diameter holding jig 11 so as to extrude bonded-magnet formed bodies 14 toward rotor core 12 such that the bonded-magnet formed bodies are deformed to undergo the formation (step S40). In this case, since grooves 11b of inside-diameter holding jig 11 are disposed to become shallower toward rotor core 12 in a phased manner, the both end portions of bonded-magnet formed bodies 14 are extended in the direction toward the outside periphery in a phased manner.

Then, as bonded-magnet formed bodies 14 are transferred toward rotor core 12, grooves 11b formed in the surface of inside-diameter holding jig 11 disappear, so that the outside peripheral face of inside-diameter holding jig 11 becomes approximately circular (including a circular shape). With this configuration, bonded-magnet formed bodies 14 are deformed such that the inside peripheral dimension of the bonded-magnet formed bodies is approximately identical to the outside peripheral dimension of rotor core 12. Note that, at this point in time, the joining between the end portions of adjacent bonded-magnet formed bodies 14 has yet to be sufficient.

Moreover, when bonded-magnet formed bodies 14 are transferred toward rotor core 12, the net result is that rotor core 12 is arranged in the inside of bonded-magnet formed bodies 14, with rotor-core presser jig 13 serving as a bottom which is arranged at the lower portion of rotor core 12. In this case, positions of pressure-welding of rotor core 12 and bonded-magnet formed bodies 14 are uniquely determined and secured by positioning projections 11a of inside-diameter holding jig 11 on which bonded-magnet formed bodies 14 are arranged, with positioning holes 12a being as a reference which are formed in rotor core 12. With this configuration, the magnetizing positions of a magnetizer can be adjusted, with positioning holes 12a of rotor core 12 being as a reference, and then magnetization is carried out such that the direction of a magnetic field generated by the magnetizer is coincident with the orientation direction of bonded-magnet formed bodies 14. As a result, this can reduce variations in distance between the poles as well as prevent occurrence of insufficient magnetization of bonded-magnet formed bodies 14.

Moreover, as shown in FIGS. 2 and 4, where rotor core 12 and bonded-magnet formed bodies 14 are pressure-welded to each other, tapered part 15a is formed at the inside periphery portion of outside-diameter-holding magnet-pressure-welding jig 15. Tapered part 15a is formed such that the inside diameter of outside-diameter-holding magnet-pressure-welding jig 15 becomes smaller, e.g. approximately 0.1 mm, than its maximum inside diameter, when the maximum is 50 mm. With this configuration, as bonded-magnet formed bodies 14 are transferred to rotor core 12, the outside periphery side of each of bonded-magnet formed bodies 14 is continuously reduced inward (compressed) to expand in its circumferential direction. As a result, the end portions of adjacent bonded-magnet formed bodies 14 are completely joined to each other (step S50).

Next, in the state where the plurality of bonded-magnet formed bodies 14 are joined to rotor core 12, bonded-magnet formed bodies 14 are subjected to thermal curing in a constant-temperature oven, for example, at a temperature of 170° C., i.e. the cure temperature of the curing agent contained in bonded-magnet formed bodies 14, for 20 minutes. In this case, except for the magnet powders, the resin components configuring bonded-magnet formed bodies 14, e.g. the epoxy resin and the polyamide resin, are softened and partly melted at the high temperature environment.

Then, when bonded-magnet formed bodies 14 are pressure-welded to rotor core 12, the resin components of the binder seeped from bonded-magnet formed bodies 14 allow the tight bonding between rotor core 12 and bonded-magnet formed bodies 14. In this case, the bonding of rotor core 12 and bonded-magnet formed bodies 14 allows the inside diameter of bonded-magnet formed bodies 14 to be determined by copying the outside periphery of rotor core 12. Therefore, rotor core 12 and bonded-magnet formed bodies 14 are bonded to each other almost without a gap (space). Moreover, since the outside periphery portion of bonded-magnet formed bodies 14 is also secured by outside-diameter-holding magnet-pressure-welding jig 15, the bonded-magnet rotor is formed with high circularity.

Next, in the state shown in FIG. 3C, the bonded-magnet rotor is cooled down to room temperature. During the cooling of the bonded-magnet rotor down to room temperature, the resin components cure which are seeped between bonded-magnet formed bodies 14 and rotor core 12. Moreover, outside-diameter-holding magnet-pressure-welding jig 15 arranged in the outside periphery side further shrinks toward the inside periphery during the cooling. This allows bonded-magnet formed bodies 14 to be secured in close contact and integrated with rotor core 12 in such a way that the bonded-magnet formed bodies copy the surface of the rotor core without a gap between the rotor core and the bonded-magnet formed bodies (step S60).

Note that the cooling is preferably carried out by forced-cooling. This is because, in the case of natural cooling, the heat heated for thermal curing of the resin components of bonded-magnet formed bodies 14 is hard to escape from the rotor core and the pressure-welding jig which both have large heat capacity. Such natural cooling provides poor stability in bonding strength and in the dimensions of the bonded-magnet formed bodies rotor after the thermal curing, which has to be prevented.

Figure 3D:
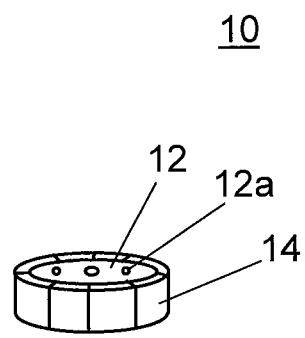
FIG. 3D is a schematic perspective view illustrating the method of manufacturing the bonded-magnet rotor according to the first exemplary embodiment of the present invention.

Then, as shown in FIG. 3D, after the cooling to room temperature, bonded-magnet rotor 10 is released by removing inside-diameter holding jig 11, rotor-core presser jig 13, outside-diameter-holding magnet-pressure-welding jig 15, and upper and lower forming jigs 16. In this case, the surface of the inside diameter side of outside-diameter-holding magnet-pressure-welding jig 15 is preferably coated with a fluorine-based coating, for example, which provides good mold-releasing properties with resins and less adhesion properties with resins, for preventing the jig from adhering to the resin components seeped from bonded-magnet formed bodies 14. Moreover, in inside-diameter holding jig 11, rotor-core presser jig 13, and upper and lower forming jigs 16, a coating material such as a fluorine-based one having less adhesion properties with resins is preferably coated on the surfaces of the jigs, where the resin components reach via the seepage from at least bonded-magnet formed bodies 14. This allows a further improvement in the mold-releasing properties of bonded-magnet rotor 10 from the respective jigs.

Note that the mold-releasing of outside-diameter-holding magnet-pressure-welding jig 15 is preferably carried out at room temperature for a simplified manufacturing process and a shortened process cycle. However, bonded-magnet rotor 10 may be released from the jigs after the jigs including outside-diameter-holding magnet-pressure-welding jig 15 are heated to a temperature of approximately 70° C., for example. In this case, outside-diameter-holding magnet-pressure-welding jig 15 is preferably configured with a material that exhibits a larger linear expansion coefficient than that of rotor core 12. With this configuration, by the temperature rise, the inside diameter of outside-diameter-holding magnet-pressure-welding jig 15 is extended in the radial direction from the outside diameter of bonded-magnet rotor 10, which allows easier mold-releasing of outside-diameter-holding magnet-pressure-welding jig 15. In this case, the curing of bonded-magnet formed bodies 14 is almost completed, because, before cooled down to room temperature, the bonded-magnet formed bodies have been held at the thermal-curing temperature of the resin components of bonded-magnet formed bodies 14. For this reason, there is no practical influence on the shape of bonded-magnet rotor 10 even when outside-diameter-holding magnet-pressure-welding jig 15 is heated to a temperature of approximately 70° C., for example.

Thus, by the manufacturing method described above, bonded-magnet rotor 10 according to the exemplary embodiment is completed.

According to the exemplary embodiment, in the steps from thermal curing to cooling in the formation of the bonded-magnet rotor, the outside periphery of the bonded-magnet formed bodies is formed always in the state where the periphery is in contact with the outside-diameter-holding magnet-pressure-welding jig. That is, dimension accuracy of the bonded-magnet rotor is determined by the dimension and shape of the outside-diameter-holding magnet-pressure-welding jig arranged at the outside diameter side, and the bonded-magnet rotor is formed reflecting dimension accuracy of the outside-diameter-holding magnet-pressure-welding jig.

As a result, circularity of the bonded-magnet rotor can be made high, depending on circularity of the inside diameter of the outside-diameter-holding magnet-pressure-welding jig.

Specifically, for the bonded-magnet rotor with the shape describe above, the circularity can be improved, from conventional 100 μm to 150 μm, to not larger than 50 μm, i.e. approximately not higher than a half.

Moreover, according to the exemplary embodiment, it is possible to form the bonded-magnet rotor with the excellent dimension accuracy. This is because, simultaneously upon curing of the bonded-magnet formed bodies, the bonded-magnet formed bodies are pressure-welded and secured to each other with the outside-diameter-holding magnet-pressure-welding jig, such that the bonded-magnet formed bodies copy the surface of the outside periphery of the rotor core. Then, when a motor is configured with the bonded-magnet rotor and a stator, it is possible to almost eliminate a magnetic gap between the bonded-magnet rotor and the stator. As a result, a magnetic loss is reduced between the bonded-magnet rotor and the stator, allowing an improvement in performances of the motor.

Specifically, for the bonded-magnet rotor with the shape describe above, the peak value of a waveform of its surface magnetic flux is improved by approximately 5%. This allows an improvement in performances of the bonded-magnet rotor and the motor using thereof.

Moreover, according to the exemplary embodiment, the positions of pressure-welding of rotor core 12 to bonded-magnet formed bodies 14 are uniquely determined and secured by positioning projections 11a of inside-diameter holding jig 11 for bonded-magnet formed bodies 14, with positioning holes 12a of rotor core 12 being as a reference. With this configuration, the magnetizing positions of the magnetizer can be adjusted with positioning holes 12a of rotor core 12 being as a reference, and then the magnetization is carried out such that the direction of the magnetic field generated by the magnetizer is coincident with the orientation direction of bonded-magnet formed bodies 14. As a result, it is possible to reduce variations in locations of the poles as well as to prevent occurrence of insufficient magnetization of bonded-magnet formed bodies 14.

Moreover, according to the exemplary embodiment, the curvature of the inside periphery of the bonded-magnet formed bodies is formed smaller than that of the outside periphery of the rotor core. With this configuration, it is possible to fit the both circumferential end portions of the respective boded-magnet formed bodies into the grooves with an approximately recessed shape (including a recessed shape). The grooves are disposed in the mold surface of the inside-diameter holding jig with the same curvature as that of the rotor core, with the jig being for arranging and holding the bonded-magnet formed bodies. As a result, it is possible to clarify the positions of the bonded-magnet formed bodies to be joined to the rotor core, resulting in increased assembly accuracy.

Specifically, phase misalignment between main bonded-magnet formed bodies of the rotor and a magnet for a sensor for positioning can be reduced from within 1 degree to within 0.6 degree, i.e. approximately a half.

Moreover, according to the exemplary embodiment, the plurality of the bonded-magnet formed bodies are pushed and transferred all at once toward the rotor core, which simultaneously allows both the deformation in the radial direction of the bonded-magnet formed bodies and the mutual joining of the circumferential end portions of adjacent ones of the bonded-magnet formed bodies, resulting in the formation of the bonded-magnet formed bodies into a ring shape. As a result, the bonded-magnet formed bodies are pressure-welded and secured on the surface of the rotor core, which allows the bonded-magnet rotor with high bonding strength and excellent dimension accuracy.

Note that, in the exemplary embodiment, although the description has been made by exemplifying the structure where the rotor core are configured by laminating, swaging, and securing the silicon steel plates, the present invention is not limited to the structure. For example, the rotor core may be configured using a bulk of metal. In this case, the rotor core is preferably configured with a material having good soft magnetic properties, which generally is chiefly composed of iron.

Moreover, in the exemplary embodiment, although the description has been made by exemplifying the bonded-magnet rotor with eight poles, the invention is not limited to this and the bonded-magnet rotor may be configured using any number of poles.

INDUSTRIAL APPLICABILITY

According to the present invention, the bonded-magnet formed bodies and the rotor core are secured to each other with a minimized magnetic gap therebetween, which allows an increase in the amount of surface magnetic flux. Hence, the present invention is useful for devices, such as motors, which accommodate magnetic circuits that require a large amount of surface magnetic flux.

The invention claimed is:

1. A method of manufacturing a bonded-magnet rotor, the method comprising the steps of:
    forming bonded-magnet formed bodies;
    arranging that includes:
        integrating an inside-diameter holding jig to support inside peripheral faces of the bonded-magnet formed bodies, a rotor core, and a rotor-core presser jig to support a lower portion of the rotor core;
        arranging a plurality of the bonded magnet formed bodies on an outside periphery of the inside-diameter holding jig; and
        arranging an outside-diameter-holding magnet-pressure-welding jig to support outside peripheral faces of the bonded-magnet formed bodies;
    deforming that includes:
        pressing the plurality of the bonded magnet formed bodies with a forming jig arranged in an up-and-down direction;
        transferring the bonded magnet formed bodies to the rotor core; and
        deforming the bonded magnet formed bodies to fit with an outside peripheral dimension of the rotor core;
    mutually joining end portions of adjacent ones of the plurality of the bonded-magnet formed bodies; and
    integrating the plurality of the bonded-magnet formed bodies with the rotor core by compressing the bodies in a direction from an outside periphery to an inside periphery thereof.

2. The method of manufacturing a bonded-magnet rotor according to claim 1, wherein
    curvature of the inside periphery of the plurality of the bonded-magnet formed bodies is smaller that of an outside periphery of the rotor core.

3. The method of manufacturing a bonded-magnet rotor according to claim 1, wherein:
    a positioning part is provided in each of the rotor-core presser jig, the inside-diameter holding jig, and the rotor core; and
    the rotor-core presser jig, the inside-diameter holding jig, and the rotor core are positioned to each other via the positioning part.

* * * * *